United States Patent
Wendling et al.

(10) Patent No.: US 8,240,733 B2
(45) Date of Patent: Aug. 14, 2012

(54) AUTOMOBILE CARPET HAVING A REMOVED SECTION

(75) Inventors: Eric C. Wendling, Columbus, OH (US); Paul T. Aebker, Dublin, OH (US); Hiroaki Taniguchi, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 203 days.

(21) Appl. No.: 12/755,947

(22) Filed: Apr. 7, 2010

(65) Prior Publication Data
US 2011/0248524 A1    Oct. 13, 2011

(51) Int. Cl.
*B60N 3/04* (2006.01)
(52) U.S. Cl. .......... 296/39.1; 296/75; 296/97.23
(58) Field of Classification Search .......... 296/39.1, 296/39.2, 75, 97.23, 193.07; 428/95
See application file for complete search history.

(56) References Cited

U.S. PATENT DOCUMENTS

| | | | |
|---|---|---|---|
| 2,986,777 A | 6/1961 | Carter | |
| 3,505,443 A | 4/1970 | Friesner | |
| 3,953,632 A * | 4/1976 | Robinson | 428/95 |
| 4,278,482 A | 7/1981 | Poteet et al. | |
| 4,465,720 A * | 8/1984 | Bell et al. | 428/85 |
| 4,579,764 A * | 4/1986 | Peoples et al. | 428/95 |
| 4,758,457 A * | 7/1988 | Altus | 428/82 |
| 5,178,434 A * | 1/1993 | Krebs | 296/37.3 |
| 5,439,725 A * | 8/1995 | Roberts | 428/95 |
| 5,573,294 A * | 11/1996 | Mack | 296/97.23 |
| 5,605,108 A * | 2/1997 | Woosley | 112/475.23 |
| 5,766,722 A * | 6/1998 | Morimoto | 428/88 |
| 6,261,667 B1 * | 7/2001 | Yang | 428/172 |
| 6,453,535 B1 | 9/2002 | Nicholas | |
| 6,460,880 B1 | 10/2002 | Gallagher et al. | |
| 6,547,301 B1 * | 4/2003 | Keller | 296/39.3 |
| 6,605,333 B2 * | 8/2003 | Ferreira et al. | 428/95 |
| 6,821,598 B2 * | 11/2004 | Gensler | 428/95 |
| 7,044,186 B2 | 5/2006 | Bennett | |
| 7,444,748 B2 | 11/2008 | MacNeil | |
| 7,475,933 B2 * | 1/2009 | Doskocz | 296/97.23 |
| 7,556,284 B2 | 7/2009 | Riha et al. | |
| 7,727,612 B2 * | 6/2010 | Haraguchi et al. | 428/99 |
| 7,900,994 B2 * | 3/2011 | Takakura et al. | 296/187.05 |
| 2009/0230717 A1 | 9/2009 | MacNeil | |
| 2011/0248524 A1 * | 10/2011 | Wendling et al. | 296/97.23 |

* cited by examiner

*Primary Examiner* — Glenn Dayoan
*Assistant Examiner* — Gregory Blankenship
(74) *Attorney, Agent, or Firm* — Rankin Hil & Clark LLP

(57) ABSTRACT

A vehicle assembly includes a vehicle floor, a vehicle seat, and an automobile carpet. The vehicle seat includes risers mounted to the vehicle floor. The automobile carpet attaches to the vehicle floor and includes a topcoat and a backing coupled with and disposed vertically below the topcoat. At least a portion of the backing is removed from the topcoat to define a removed section disposed below and longitudinally aligned with the vehicle seat. A method for installing the automobile carpet and the automobile carpet are also disclosed.

19 Claims, 4 Drawing Sheets

AUTOMOBILE CARPET HAVING A REMOVED SECTION

BACKGROUND

Vehicle manufacturers generally employ two different types of carpet construction methods. In a first method, which can be referred to as a two-step process, a topcoat is formed in a tool and then trimmed by a water-jet process. The topcoat includes a pile adhered to a mass back. To form the top coat into a shape that is appropriate for placing inside an automobile, a topcoat blank is placed in the tool and a press contacts the topcoat to form the topcoat into the appropriate shape. The formed topcoat blank is then trimmed and transferred to a separate jig that is used to apply individual pieces of a die-cut backing, which is also referred to as insulation material. Using this two-step process, the topcoat does not share the same shape, holes, or trim lines as the backing since each has been formed and cut in separate processes.

In another method, the topcoat and backing are formed together in a single tool and are then trimmed by a water-jet process. In this method, the topcoat and backing have the same shape, holes and trim lines because they have been formed together before the trimming operation. This method can be referred to as a one-step carpet process which has been found to provide improved noise, vibration and harshness (NVH) characteristics versus a typical two-step carpet process described above.

When using the one-step process, because the backing has been affixed to the topcoat prior to any trimming, the thickness of the automobile carpet is a function of the thickness of the backing (or insulation material) and the thickness of the topcoat. The thickness of the automobile carpet can be a factor when considering passenger foot space within a vehicle. Problems can result by providing an automobile carpet within an area of the vehicle where there is small clearance for vehicle occupant foot space.

SUMMARY

An example of a vehicle assembly that can overcome at least some of the aforementioned shortcomings includes a vehicle floor, a vehicle seat, and an automobile carpet. The vehicle seat includes risers mounted to the vehicle floor. The automobile carpet attaches to the vehicle floor and includes a topcoat and a backing coupled with and disposed vertically below the topcoat. At least a portion of the backing is removed from the topcoat to define a removed section disposed below and longitudinally aligned with the vehicle seat.

An example of a method for installing an automobile carpet in an automobile interior that can overcome at least some of the aforementioned shortcomings includes providing an automobile carpet including a topcoat and a backing coupled to the topcoat, positioning the carpet within the automobile, and affixing the carpet to a vehicle body of the automobile. At least one section of the backing is removed from the topcoat to define at least one removed section. The at least one removed section is located in an area generally occupied by a passenger's feet when seated on a vehicle seat in the automobile.

An example of an automobile carpet that can overcome at least some of the aforementioned shortcomings includes a topcoat and an insulator. The automobile carpet is for a vehicle including a vehicle floor and occupant seats mounted to the vehicle floor. The topcoat includes a pile and a mass back. The pile is affixed to the mass back. The insulator adheres to the mass back such that the mass back is interposed between the topcoat and the insulator. At least one section of the insulator is removed from the mass back to define a removed section located with respect to a periphery of the carpet so as to be located on the vehicle floor in front of at least one of the occupant seats of the vehicle.

DETAILED DESCRIPTION

Figure 1:
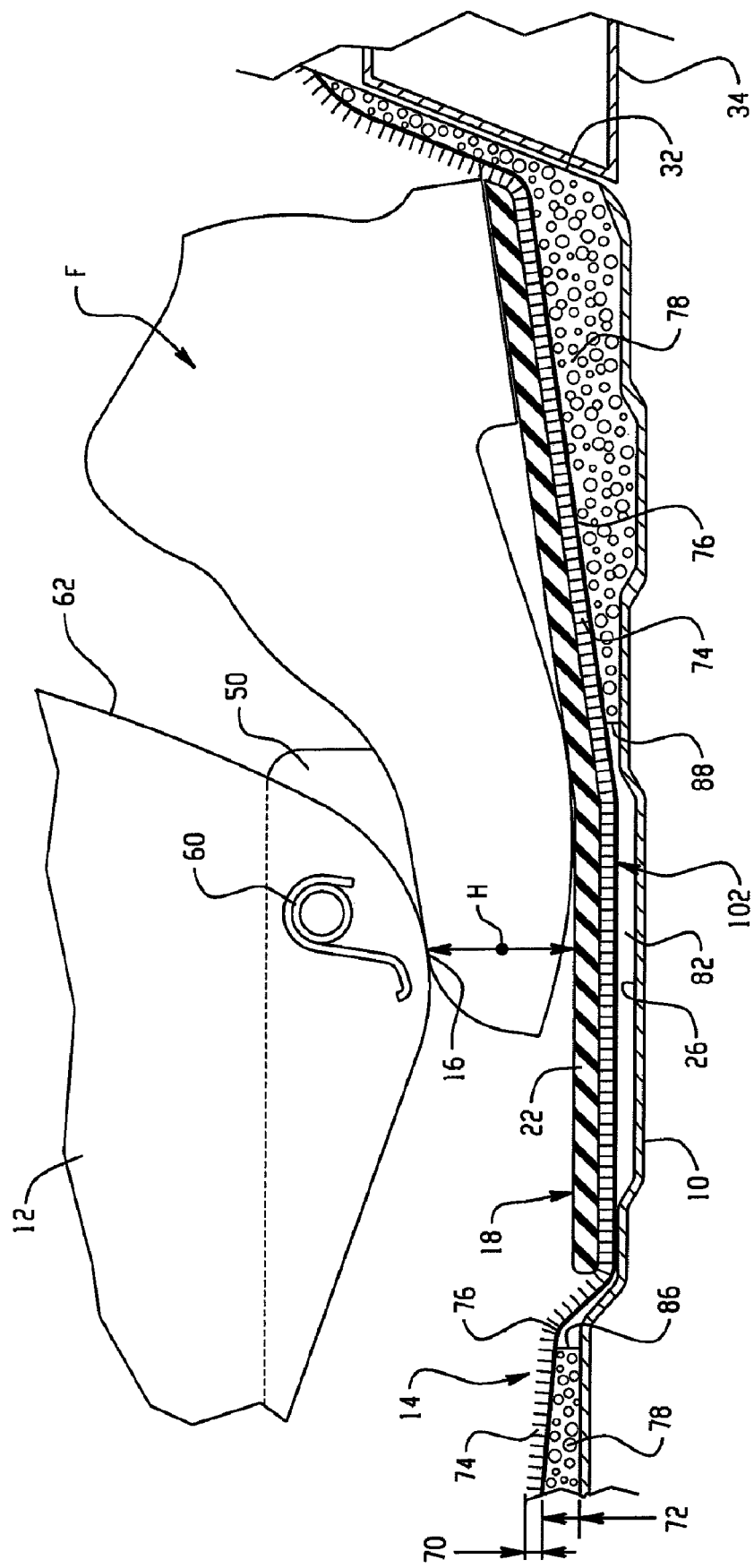
FIG. 1 is a side schematic view of a portion of an automobile depicting a lower portion of a vehicle seat, a vehicle floor, automobile carpet and a passenger's foot extending under the vehicle seat.

The description and drawings herein are merely illustrative and various modifications and changes can be made in the structures disclosed without departing from what is defined in the appended claims. All references to direction and position, unless otherwise indicated, refer to the orientation of the structures and components illustrated in the drawings and should not be construed as limiting the claims appended hereto. Like numbers refer to like parts throughout the several views.

With reference to FIG. 1, a vehicle assembly for an automobile (the entirety of which is not depicted) is shown as including a vehicle floor 10, a vehicle seat 12, and an automobile carpet 14. The automobile carpet 14 is manufactured in a manner to increase an available clearance H under a lowermost location 16 on the vehicle seat 12 for a passenger's foot F. As illustrated, the clearance H is measured between the lower most location 16 of the vehicle seat 12 and an upper surface 18 of a vehicle floor mat 22, which rests on the automobile carpet 14, and is located at least partially beneath the vehicle seat 12. The automobile carpet 14 in the illustrated embodiment is made using the one-step process described above; however, the automobile carpet 14 undergoes additional processing and is oriented within the automobile in such a manner to increase the clearance H as compared to automobile carpets that are manufactured using the aforementioned one-step process but do not undergo the additional processing.

Figure 2:
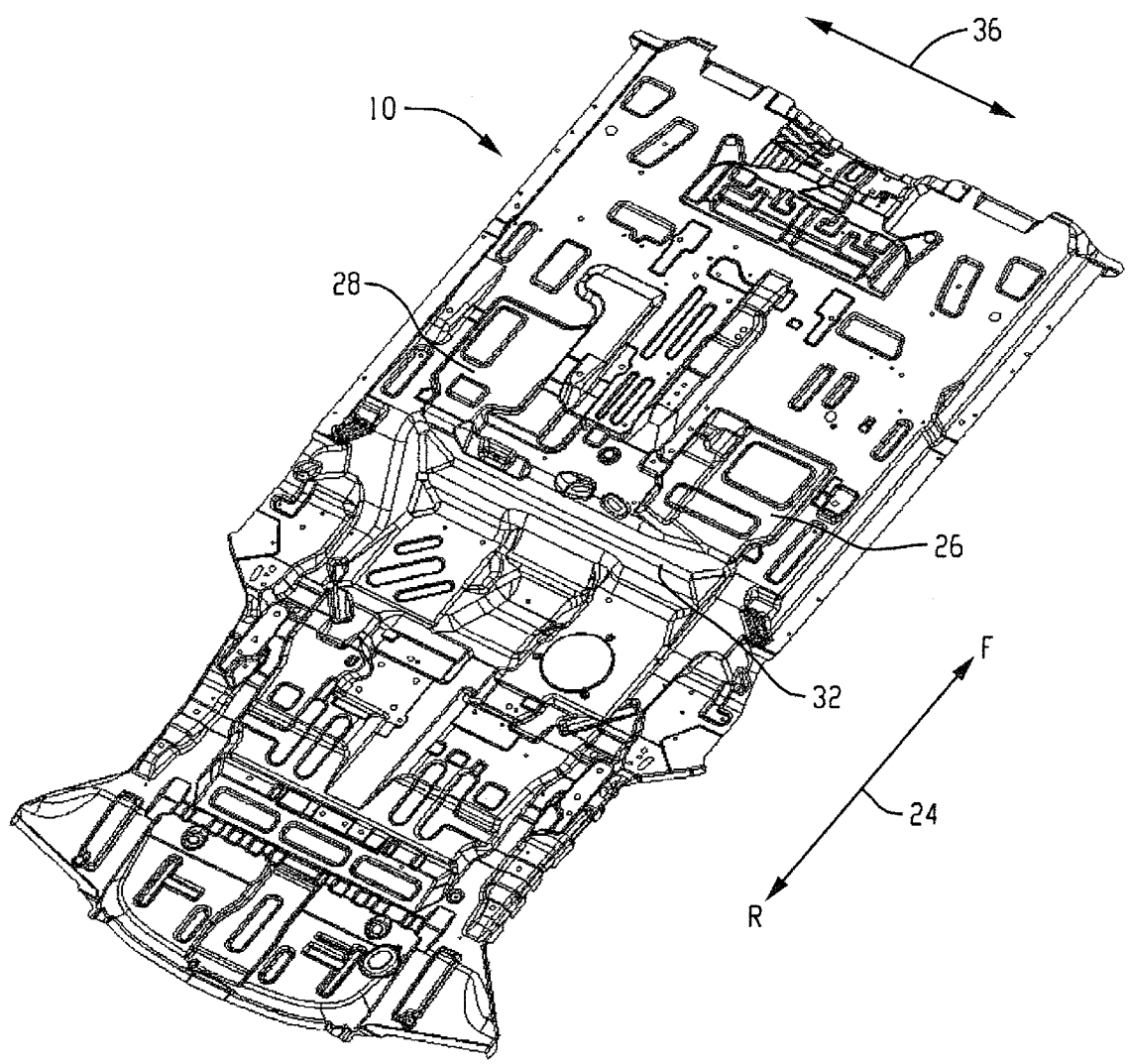
FIG. 2 is a top perspective view of the vehicle floor depicted in FIG. 1.

The vehicle floor 10 is shown in FIG. 2. The vehicle floor 10 can be similar to a conventional vehicle floor and can be made from stamped metal. Vehicle seats, such as the vehicle seat 12 shown in FIG. 1, mount to the vehicle floor 10. The vehicle floor 10 can make up a component of a vehicle body (not shown) of an automobile (not shown). The automobile that includes the vehicle floor 10 travels in a direction depicted by arrow 24, where F refers to a forward direction and R refers to a backwards or rear direction. In the illustrated embodiment, the vehicle floor 10 can include first and second recesses 26, 28 in an area where a rear passenger's feet would typically be positioned when the rear passenger is seated on a rear vehicle seat (not shown) in the automobile. In the illustrated embodiment, the first recess 26 is disposed generally underneath a front passenger's seat 12 and the second recess 28 is disposed generally underneath a driver's seat (not shown). The first recess 26 is also depicted in FIG. 1.

With reference back to FIG. 2, the vehicle floor 10 also includes a channel 32 that receives a laterally extending cross member 34 (depicted schematically in FIG. 1) that extends across the vehicle in a lateral direction 36. The cross member 34 connects with longitudinally extending frame members (not shown) of the automobile. The remainder of the vehicle floor 10 can be similar to known vehicle floors; therefore, further description thereof is not provided.

As mentioned above, the vehicle seats mount to the vehicle floor. Only the front passenger's seat 12 is depicted in FIG. 1; however, additional vehicle seats, which can include the driver's seat and rear passenger seats can also be provided in the automobile. At least the front passenger's seat 12 and the driver's seat mount to the vehicle floor 10 by way of risers. Each vehicle seat can mount to the vehicle floor 10 using two risers that are laterally spaced (in the direction of arrow 36) from one another. Mounting locations for the risers for the front seats are visible in FIG. 3. For the front passenger's seat 12 (FIG. 1), a rear outboard opening 42 and a front outboard opening 44 can be formed in the automobile carpet 14 to allow an outboard riser (not shown) for the front passenger's seat to connect with the vehicle floor 10. A rear inboard opening 46 and a front inboard opening 48 can be formed in the automobile carpet 14 to allow the front passenger's seat inboard riser 50 (FIG. 1) to attach to the vehicle floor 10. Similarly, a rear outboard opening 52 and a front outboard opening 54 can be provided in the vehicle carpeting 14 to attach the driver's seat outboard riser (not shown) to attach to the vehicle floor 10. A rear inboard opening 56 and a front inboard opening 58 can also be provided in the automobile carpet 14 for attaching the inboard riser (not shown) for the driver's seat. The rear passenger seats can be disposed behind the driver's seat and the front passenger's seat and these seats can also attach to the vehicle floor 10 in a conventional manner.

Each of the vehicle seats can be conventional. With reference to FIG. 1, the front passenger's seat 12 is shown to include an internal frame member 60, which can connect to the inboard riser 50 and the outboard riser (not shown). Upholstery, e.g. leather and/or cloth, 62 can cover the internal components of each vehicle seat.

With continued reference to FIG. 1, the automobile carpet 14 attaches to the vehicle floor 10 in any manner known to those skilled in the art, e.g. using clips and mounting portions of the vehicle seats. The automobile carpet 14 includes a topcoat 70 and a backing 72 coupled with and disposed vertically below the topcoat. In the illustrated embodiment, the topcoat 70 includes a pile 74, which can also be referred to as a pile layer, and a mass back 76, which can also be referred to as a mass back layer. The mass back 76 gives the carpet 14 a dense rubber-like backing to enhance noise, vibration and harshness (NVH) characteristics for the automobile. The backing 72 includes an insulation material 78 that provides padding for the automobile carpet 14. The mass back layer 76 is interposed between the pile layer 74 and the backing 72, or the insulation material 78.

Figure 4:
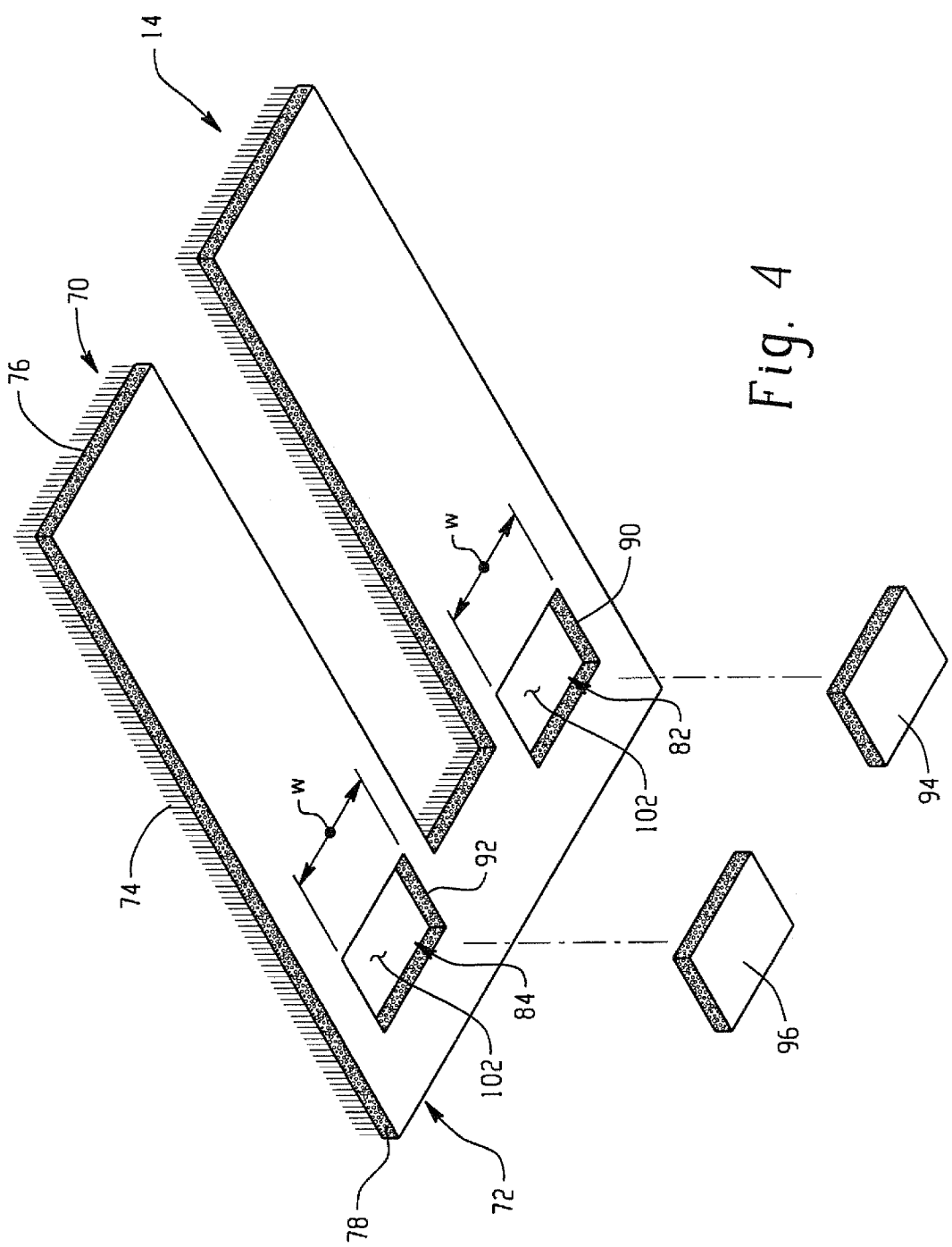
FIG. 4 is a schematic representation of a lower portion of the automobile carpet depicted in FIG. 3 prior to a trimming operation.

As mentioned above, the automobile carpet 14 can be manufactured via a one-step process. In such a process, the topcoat 70 and the backing 72 are separate stock materials that each can be provided as blanks. FIG. 4 schematically depicts the carpet 14 prior to a trimming procedure, i.e. the topcoat blank is affixed to the backing blank before the final trimming, however, the carpet 14 would most likely include contours that generally match the contours of the vehicle floor 10 to which the carpet 14 is affixed. The backing blank can be placed in a die and the mass back 76 of the topcoat blank can be heated and then placed into the die with the backing 72. A press then comes down onto the topcoat 70 and the topcoat 70 and the backing 72 remain in the die for a predetermined cure time. The carpet 14 is then removed from the die and is cut and trimmed by way of a water-jet process similar to the known one-step process described above. The automobile carpet 14 then undergoes additional processing where at least a portion of the backing 72 (or insulation material 78) is removed from the topcoat 70 to define a removed section, such as a first removed section 82 and a second removed section 84. In the illustrated embodiment, the removed sections 82, 84 are each devoid the insulation material 78, which decreases the thickness of the automobile carpet 14 in these selected areas.

Figure 3:
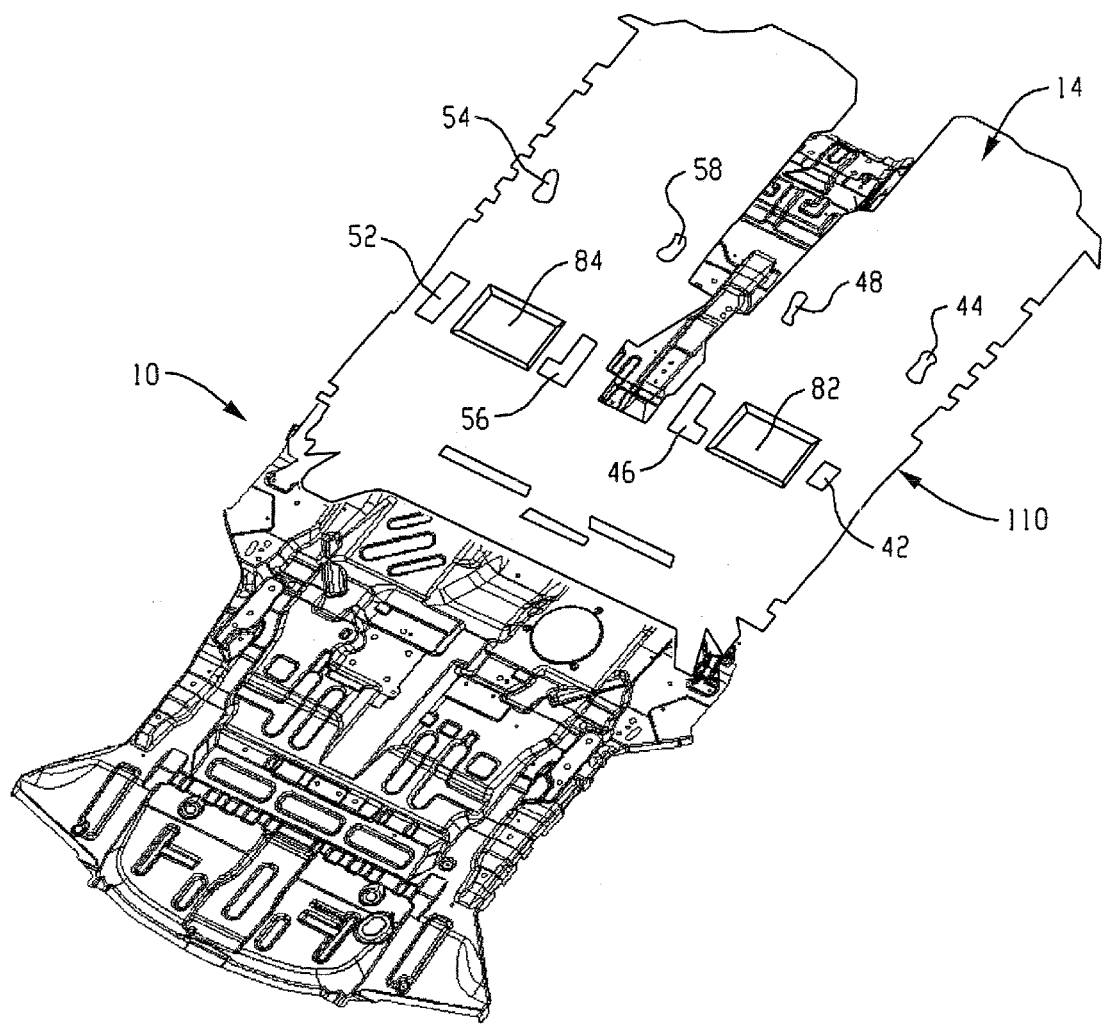
FIG. 3 is a top perspective view of the vehicle floor and a schematic depiction of the automobile carpet overlaying the vehicle floor.

The first and second removed sections 82, 84 are associated with the vehicle seats. Particularly, the first removed section 82, as schematically depicted in FIG. 3, is disposed below and longitudinally aligned with the front passenger's seat 12 (FIG. 1). The second removed section 84 is disposed on an opposite lateral side of the vehicle floor 10 and is disposed below and longitudinally aligned with the driver's seat. With reference to FIG. 4, each removed section 82, 84 has a lateral dimension w that is substantially similar to a lateral dimension between the risers for the respective vehicle seat (see FIG. 3). With reference back to FIG. 1, the first removed section 82, which is disposed below the passenger seat 12, is defined by a forward laterally extending edge 86 disposed longitudinally forward from the lower most location 16 on the vehicle seat 12. The first removed section 82 is also defined by a rear laterally extending edge 88 that is disposed rearwardly from the lower most location 16 on the vehicle seat. The rear lateral edge 88 is also forwardly disposed from the channel 32, which receives the laterally extending cross member 34. Accordingly, the backing 72, as well as the insulation material 78 associated therewith, is longitudinally disposed between the first removed section 82 and the channel 32 so cushioning is provided for an occupant's feet F in a location forward of the rear seats. As illustrated in FIG. 1, the backing 72 can comprise the insulation material 78 and the insulation material can have a greater thickness nearer the channel 32 as compared to adjacent the removed section 82. Accordingly, the thickness of the insulation material 78 as well as the thickness of the automobile carpet 14 can vary.

To form each removed section 82, 84, according to one exemplary aspect the backing layer 72 is kiss cut along a boundary 90, 92, respectively, and a portion 94, 96, respectively, of the backing layer 72 defined by each boundary is removed after the backing layer is kiss cut to define the removed sections 82, 84, respectively. The kiss cutting operation can use a die cut that penetrates into the backing 72 so that the insulation material 78 located outside of each boundary 90, 92 remains coupled to the topcoat 70 leaving the inner portions 94, 96 of the backing 72 ready to be peeled off from the topcoat 70. The kiss cut extends through the backing 72 to a lower surface 102 of the topcoat 70, which is coincident with a lower surface of the mass back 76. The backing material within the boundary, e.g. each portion of the backing layer defined by the boundary, is removed from the topcoat 70 to define the removed sections 82, 84.

With reference to FIG. 4, the automobile carpet 14 for a vehicle including the vehicle floor 10 and occupant seats mounted to the vehicle floor includes the topcoat 70, which includes the pile 74 and the mass back 76. The pile 74 is affixed to the mass back 76. The automobile carpet 14 also includes the insulator 78, which is adhered to the mass back 76 such that the mass back is interposed between the pile 74 and the insulator 78. At least one section, e.g. portions 94 and 96, of the insulator 78 has been removed from the mass back 76, and thus the topcoat 70, to define a removed section, e.g.

removed sections 82 and 84, located with respect to a periphery 110 (FIG. 3) of the carpet 14 so as to be located on the vehicle floor 10 in front of at least one of the occupant seats of the vehicle. As seen in FIG. 4, each removed sections 82, 84 is bounded on all sides by the insulator 78. As explained above, each removed section 82, 84 consists of the mass back 76 and the pile layer 74. With reference to FIG. 1, by providing the removed section 82, the clearance H for the passenger's foot F can be increased, as compared to if the backing 72, or the insulation material 78 associated therewith, were to remain affixed to the topcoat 70 in the area of the automobile carpet 14 located under the front passenger's seat 12.

A method for installing the automobile carpet 14 in an automobile interior will now be described. The method includes providing the automobile carpet 14, which can include the topcoat 70 and the backing 72 coupled to the topcoat, where at least one section, e.g. the removed portions 94 and 96 shown in FIG. 4, of the backing is removed from the topcoat to define at least one removed section, e.g. the removed sections 82, 84 (FIG. 4). The method for installing the automobile carpet 14 in an automobile interior can also include positioning the carpet 14 within the automobile where the at least one removed section, e.g. the removed sections 82, 84, are each located in an area generally occupied by a passenger's feet once seated on a vehicle seat in the automobile (see FIG. 3). The method for installing the automobile carpet 14 can further include affixing the carpet 14 to a vehicle body of the automobile, for example the carpet 14 can be affixed to the vehicle floor 10.

Positioning the carpet 14 within the automobile can further include positioning at least one removed section, e.g. the first removed section 82 and the second removed section 84, on the floor 10 of the vehicle in front of the rear passenger seat(s) of the vehicle. Positioning the carpet 14 within the automobile can further include positioning the at least one removed section, e.g. the removed sections 82, 84, beneath a driver's seat or a front passenger seat of the automobile. As described above, the first removed section 82 is disposed beneath the passenger's seat and the second removed section 84 is disposed beneath the driver's seat. Positioning the carpet 14 within the automobile can further include positioning the at least one removed section, e.g. the removed sections 82, 84, between the risers for the driver's seat or the risers for the passenger's seat. As explained above, each removed section 82, 84 has a lateral width w that is substantially similar to a lateral dimension between the risers of each respective vehicle seat. More particularly, the lateral width can be slightly smaller than the lateral width between the respective risers.

As explained above, the topcoat 70 includes the pile layer 74 and the mass back layer 76 disposed beneath the pile layer. The mass back layer 76 is interposed between the pile layer 74 and the backing 72. Affixing the carpet 14 to the vehicle body can further include affixing the backing 72 to the floor 10 of the vehicle body and also affixing the mass back layer 76 in the removed section, e.g. first removed section 82 or the second removed section 84, to the floor 10.

An automobile carpet, a vehicle assembly including the automobile carpet and a method for installing the automobile carpet has been described above with particularity. Modifications and alterations will occur to those upon reading and understanding the preceding detailed description. For example, the removed sections can be located in other areas of the vehicle floor that could be occupied by a passenger's feet. The invention, however, is not limited to only the embodiments described above. Instead, the invention is defined by the appended claims and the equivalents thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle assembly comprising:
   a vehicle floor;
   a vehicle seat including risers mounted to the vehicle floor and defining a foot clearance distance H under a lowermost location on the vehicle seat between the risers; and
   an automobile carpet attached to the vehicle floor and including a topcoat and a backing coupled with and disposed vertically below the topcoat, wherein at least a portion of the backing is removed from the topcoat to define a removed section disposed longitudinally aligned with the vehicle seat, wherein the removed section is disposed below the vehicle seat in an area generally occupied by a rear passenger's feet when seated on a rear vehicle seat.

2. The vehicle assembly of claim 1, wherein the backing comprises an insulation material and the removed section is devoid the insulation material.

3. The vehicle assembly of claim 1, wherein the topcoat includes a pile layer and a mass back layer, wherein the mass back layer is interposed between the pile layer and the backing, wherein the removed section consists of the pile layer and the mass back layer.

4. The vehicle assembly of claim 1, wherein the removed section has a lateral dimension that is substantially similar to a lateral dimension between the risers of the vehicle seat.

5. The vehicle assembly of claim 4, wherein the removed section is defined by a forward laterally extending edge forwardly disposed from a rear laterally extending edge, wherein the forward edge is disposed longitudinally forward from the lowermost location on the vehicle seat and the rear edge is disposed rearwardly from the lowermost location on the vehicle seat.

6. The vehicle assembly of claim 5, further comprising a laterally extending cross member, wherein the vehicle floor defines a channel that receives the cross member, wherein rear lateral edge is forwardly disposed from the channel.

7. The vehicle assembly of claim 6, wherein the backing comprises an insulation material having a greater thickness nearer the channel as compared to adjacent the removed section.

8. The vehicle assembly of claim 1, wherein the vehicle seat includes a driver's seat and a front passenger's seat and the removed section includes a first removed section disposed generally beneath the front passenger's seat and a second removed section disposed generally beneath the driver's seat.

9. A method for installing an automobile carpet in an automobile interior, the method comprising:
   providing an automobile carpet including a topcoat and a backing coupled to the topcoat, wherein at least one section of the backing has been removed from the topcoat to define at least one removed section;
   positioning the carpet within an automobile where the at least one removed section is located beneath a driver's seat or a front passenger's seat of the automobile; and
   affixing the carpet to a floor of a vehicle body of the automobile.

10. The method of claim 9, wherein positioning the carpet within the automobile further includes positioning the at least one removed section between risers for the driver's seat or risers for the passenger's seat.

11. The method of claim 9, wherein the top coat includes a pile layer and a mass back layer disposed beneath the pile layer, and the mass back layer is interposed between the pile layer and the backing, wherein affixing the carpet to the vehicle body includes affixing the backing to the floor of the vehicle body.

12. A vehicle assembly comprising:
a vehicle floor;
a vehicle seat including risers mounted to the vehicle floor and defining a foot clearance distance H under a lowermost location on the vehicle seat between the risers; and
an automobile carpet attached to the vehicle floor and including a topcoat and a backing coupled with and disposed vertically below the topcoat, wherein at least a portion of the backing is removed from the topcoat to define a removed section disposed longitudinally aligned with the vehicle seat, wherein the removed section has a lateral dimension that is substantially similar to a lateral dimension between the risers of the vehicle seat.

13. The vehicle assembly of claim 12, wherein the removed section is defined by a forward laterally extending edge forwardly disposed from a rear laterally extending edge, wherein the forward edge is disposed longitudinally forward from the lowermost location on the vehicle seat and the rear edge is disposed rearwardly from the lowermost location on the vehicle seat.

14. The vehicle assembly of claim 13, further comprising a laterally extending cross member, wherein the vehicle floor defines a channel that receives the cross member, wherein rear lateral edge is forwardly disposed from the channel, wherein the backing comprises an insulation material having a greater thickness nearer the channel as compared to adjacent the removed section.

15. A vehicle assembly comprising:
a vehicle floor;
a vehicle seat including risers mounted to the vehicle floor and defining a foot clearance distance H under a lowermost location on the vehicle seat between the risers; and
an automobile carpet attached to the vehicle floor and including a topcoat and a backing coupled with and disposed vertically below the topcoat, wherein at least a portion of the backing is removed from the topcoat to define a removed section disposed longitudinally aligned with the vehicle seat, wherein the vehicle seat includes a driver's seat and a front passenger's seat and the removed section includes a first removed section disposed generally beneath the front passenger's seat and a second removed section disposed generally beneath the driver's seat.

16. The vehicle assembly of claim 15, wherein the removed section has a lateral dimension that is substantially similar to a lateral dimension between the risers of the vehicle seat.

17. The vehicle assembly of claim 15, further comprising a laterally extending cross member, wherein the vehicle floor defines a channel that receives the cross member, wherein rear lateral edge is forwardly disposed from the channel, wherein the backing comprises an insulation material having a greater thickness nearer the channel as compared to adjacent the removed section.

18. A method for installing an automobile carpet in an automobile interior, the method comprising:
providing an automobile carpet including a topcoat and a backing coupled to the topcoat, wherein at least one section of the backing has been removed from the topcoat to define at least one removed section, wherein the top coat includes a pile layer and a mass back layer disposed beneath the pile layer, and the mass back layer is interposed between the pile layer and the backing;
positioning the carpet within an automobile where the at least one removed section is located in an area generally occupied by a rear passenger's feet when seated on a rear vehicle seat in the automobile; and
affixing the backing to a floor of a vehicle body.

19. The method of claim 18, wherein positioning the carpet within the automobile further includes positioning the at least one removed section between risers for the driver's seat or risers for the passenger's seat.

* * * * *